United States Patent
Harrison et al.

(10) Patent No.: US 8,051,482 B2
(45) Date of Patent: Nov. 1, 2011

(54) NULLIFICATION OF MALICIOUS CODE BY DATA FILE TRANSFORMATION

(75) Inventors: Keith Alexander Harrison, Chepstow (GB); Richard Smith, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1035 days.

(21) Appl. No.: 11/931,563

(22) Filed: Oct. 31, 2007

(65) Prior Publication Data

US 2008/0313735 A1    Dec. 18, 2008

(30) Foreign Application Priority Data

Oct. 31, 2006    (GB) .................................. 0621656.8

(51) Int. Cl.
    *G06F 21/00* (2006.01)
(52) U.S. Cl. ......................................................... 726/23
(58) Field of Classification Search .................... 726/23, 726/24; 713/188
    See application file for complete search history.

(56) References Cited

U.S. PATENT DOCUMENTS

| | | | |
|---|---|---|---|
| 6,487,664 B1 | 11/2002 | Kellum | |
| 6,842,861 B1 | 1/2005 | Cox | |
| 7,168,625 B2 | 1/2007 | Girard et al. | ................... 235/492 |
| 2002/0116639 A1 | 8/2002 | Chefalas et al. | |
| 2003/0120812 A1 | 6/2003 | Nitta | |
| 2003/0145213 A1 | 7/2003 | Carbone | |
| 2003/0188196 A1 | 10/2003 | Choi | |
| 2003/0196104 A1 | 10/2003 | Baber et al. | |
| 2003/0229810 A1 | 12/2003 | Bango | |
| 2005/0218234 A1 | 10/2005 | Girard et al. | |

FOREIGN PATENT DOCUMENTS

| | | |
|---|---|---|
| DE | 100 23 249 A1 | 11/2001 |
| DE | 102 35 819 A1 | 2/2004 |
| EP | 1022639 A2 | 7/2000 |
| EP | 1237065 A1 | 9/2002 |
| GB | 2367714 A | 4/2002 |
| GB | 2383444 A | 5/2002 |
| GB | 2418500 A | 3/2006 |
| WO | 2005/085971 A | 9/2005 |

OTHER PUBLICATIONS

SnapFiles "Anti-virus tools" from http://www.snapfiles.com/shareware/security/swvirus.html, Mar. 10, 2008.

Marcolini, M., "Erwetiterter Zugangsschutz" Telecom Report Siemen AG Munchen DE vol. 11, No. 4, pp. 150-152 (Jul. 1, 1988).

*Primary Examiner* — Gilberto Barron, Jr.
*Assistant Examiner* — Devin Almeida (57) ABSTRACT

To nullify any malicious code potentially contained within a data file, a transformation engine randomly selects a transformation from a number of available file transformations each arranged to alter the bit pattern of a file to which it is applied while still enabling manifestation of at least some of the file's semantic content to a user. The selected transformation is then applied to the data file to produce a transformed file. Preferably, the transformation engine runs in a dedicated virtual machine of a computing platform.

22 Claims, 8 Drawing Sheets

```
<?xmlversion="1.0">
<Document>
 <Paragraphid="1" format="underline">
    <Text> MY CAT </Text>
  </Paragraph>
  <Paragraphid="2">
    <Text>My</Text>
    <Text>cat</Text>
    <Text>sat</Text>
    <Text>on</Text>
    <Text>the</Text>
    <Text>mat</Text>
    </Text>
  </Paragraph>
  <Paragraphid="3">
    <Text> The End </Text>
  </Paragraph>
</Document>
```

Fig. 9

```
ff d8 ff e0 00 10 4a 46 49 46 00 01 01 01 00 48  |......JFIF.....H|
00 48 00 00 ff fe 00 36 20 49 6d 61 67 65 20 67  |.H.....6 Image g|
65 6e 65 72 61 74 65 64 20 62 79 20 45 53 50 20  |enerated by ESP |
47 68 6f 73 74 73 63 72 69 70 74 20 28 64 65 76  |Ghostscript (dev|
69 63 65 3d 70 6e 6d 72 61 77 29 0a ff db 00 43  |ice=pnmraw)....C|
00 01 01 01 01 01 01 01 01 01 01 01 01 01 01 01  |................|
01 01 01 01 01 01 01 01 01 01 01 01 01 01 01 01  |................|
01 01 01 01 01 01 01 01 01 01 01 01 01 01 01 01  |................|
01 01 01 01 01 01 ff c0 00 11 08 01 0d 00 ab 03  |................|
01 22 00 02 11 01 03 11 01 ff c4 00 1f 00 00 02  |."..............|
08 09 06 07 0b 05 04 03 02 01 ff c4 00 3b 10 00  |.............;..|
01 05 00 02 01 04 01 04 02 00 04 03 06 06 03 04  |................|
01 02 03 05 06 07 08 11 00 09 12 13 14 0a 15 21  |...............!|
22 16 31 23 24 32 41 17 18 51 25 33 42 52 61 62  |".1#$2A..Q%3BRab|
19 34 53 59 81 91 98 d7 f0 ff c4 00 1c 01 00 02  |.4SY............|
02 03 01 01 00 00 00 00 00 00 00 00 00 00 06 07 7
```

FIG. 5

```
89 50 4e 47 0d 0a 1a 0a 00 00 00 0d 49 48 44 52  |.PNG........IHDR|
00 00 00 ab 00 00 00 01 0d 08 02 00 00 00 ff b8 02  |................|
09 00 00 00 09 70 48 59 73 00 00 0b 12 00 00 0b  |.....pHYs.......|
12 01 d2 dd 7e fc 00 00 00 09 76 70 41 67 00 00  |....~.....vpAg..|
00 ab 00 00 01 0d 00 d2 65 48 5e 00 00 80 00 49  |........eH^A...I|
44 41 54 78 da e4 5d 07 5c 53 e7 0e 95 82 b5     |DATx..\.........|
75 60 5d eb e8 12 3b ac da 5a 05 ad 56 71 8f 6a  |u`[..;.Z.Vq.j|
a0 a8 cc 10 12 42 02 82 c8 76 20 8a 83 5a b1 86  |.....B...v  ..Z.|
e0 c6 bd 00 b5 2a 88 7b 02 df 79 df 73 ef cd 4d  |.....*.{..y.s..M|
08 68 fb ef b0 fd f2 bb 21 24 f7 de f7 79        |.h......!$...y|
cf 79 ce 16 d4 fe 49 8f 9a da 6a f2 c3 c0 eb     |.y....I...j....|
35 f5 fd 01 ef 17 35 35 35 ff e3 09 a8 d5 ea 94  |5....555........|
62 c8 90 21 83 07 0f 1e 3a 74 a8 17 7d 2c 5a b4  |b..!....t..},Z.|
28 28 28 28 8f 7d d4 f9 98 6a 7a 18 3a 5f ee 0c  |((((.}...jz.:_..|
eb bd a4 fa le f5 7e e6 0b 6e 68 4d ed df f0 10  |......~..nhM....|
fc 91 c5 66 ef 05 7f d9 f4 4e 58 fb 9e 97 43 c0  |...f.....NX...C.|
cb 7c 5d dd 25 87 15 9d 3b 77 2e 2c b3 80 f7 30  |.|].%...;w.,...0|
aa 73 bc 66 44 7e 1a 7c 98 99 99 01 62 a2 a3 a3  |.s.fD~.|....b...|
```

FIG. 6

MY CAT

My cat sat on the mat.

The End

Fig. 7

```
<?xmlversion="1.0">
<Document>
<Title> MY CAT </Title>
<Paragraphid="1">
    <Text>
    My cat sat on the mat.
    </Text>
</Paragraph>
<Paragraphid="2">
    <Text> The End </Text>
</Paragraph>
</Document>
```

NULLIFICATION OF MALICIOUS CODE BY DATA FILE TRANSFORMATION

BACKGROUND TO THE INVENTION

1. Field of the Invention

The present invention relates to the transformation of data files for the purpose of nullifying malicious code that may be contained within any such file.

Malicious code is a generic term, and includes within its scope code which is assimilable within an entity capable of executing instructions (a 'host') which, upon such assimilation is capable of causing one of a number of effects, usually both unwanted and unintended by the user of such a host. For example, such code may affect the operation of: a host within which the code is assimilated (e.g. by deleting data or exposing it to external attack); a network of which the host forms a part (e.g. by generating traffic and thus slowing down the network); other hosts in such a network (e.g. by a denial of service attack on such hosts); or a user of the host (e.g. by causing disclosure of secret information in possession of the user).

Malicious code typically has two elements to it. The first element is known in the art as 'exploit code', that is to say code which is specifically adapted to exploit a certain characteristic (and usually unintended) response of a host to enable a attacker to gain privileged access to it (privileged access being access of a kind which would typically be reserved for a user or administrator of the host). The second malicious code element is known as a 'payload' and this is code which can be loaded onto a host once privileged access has been secured by the exploit code. Typically, execution of the payload code will cause the host to perform certain operations which are intended by the attacker; almost always that will mean the host operating in a way unintended by the user.

Hosts are exposed to malicious code in a number of ways. One way is simply by connecting their host to the Internet. Attackers automatically scan hosts which are connected to the Internet to check for vulnerabilities to attack by exploit code; in the event that such vulnerabilities are detected, a attacker may then decide to use an appropriate exploit code to gain privileged access to such a vulnerable host and load and execute payload code. Exploit code may also exploit user actions in certain cases. For example, a user may receive an email with an attached data file purporting to be legitimate but containing exploit code which executes on opening the attachment and causes the deployment of payload code on the host. In the instance of certain vulnerabilities and hosts the need for exploit code can be circumvented by user actions such as: opening an email attachment; choosing to download a data file from a website or during an instant messaging session with another user; or inadvertently loading malicious code onto a host by connecting a storage medium such as a CD or USB flash memory to their host and copying data from that medium onto their host.

2. Description of Related Art

The current practice for dealing with malicious code is to monitor the production of such code and produce remedial patches which remove the host's vulnerability to it. Monitoring can include relatively covert surveillance of the activity of certain known attackers, as well as tracking the incidence of publicly reported vulnerabilities. This practice is enhanced by the use of known exploit codes carrying benign payloads to scan hosts for vulnerabilities in order to establish which hosts of a network require patching, for example. Another remediating measure is to equip each host in a network with a client that throttles the output of packets from any host whose behaviour starts to indicate infection by malicious code, thereby limiting the rate of propagation of malicious code in the event of infection.

In addition, firewalls of networks scan incoming data files to identify malicious code and quarantine any data file which may be thought to be malicious.

Each of these measures, however, suffers from the same flaw, which is that they're remediating measures. A remedial patch is usually only developed in response to a detected vulnerability and, since vulnerabilities are most often found by attackers, at least some hosts will have been subjected to malicious code attack before anything can be done to protect against that form of attack. In short, current practices are based on a game of 'catch up' with the attackers and, by definition, the best that can ever be achieved is a very close second place.

SUMMARY OF THE INVENTION

According to a first aspect of the present invention there is provided a method of nullifying malicious code potentially contained within a data file received by a computing platform, the method comprising:

selecting, at random, a transformation to be applied to the received data file from at least two available transformations, each transformation being such as to alter the bit pattern of a file to which it is applied while still enabling manifestation of at least some of the file's semantic content to a user, and applying the selected transformation to the received data file to generate a transformed file.

According to another aspect of the present invention, there is provided a A transformation engine for nullifying malicious code potentially contained within a data file, the transformation engine comprising:

a library of available transformations each arranged to alter the bit pattern of a file to which it is applied while still enabling manifestation of at least some of the file's semantic content to a user;

a selection arrangement for selecting, at random, a transformation to be applied to the data file from said available transformations; and an arrangement for applying the selected transformation to the data file to generate a transformed file.

BRIEF DESCRIPTION OF DRAWINGS

Embodiments of the invention will now be described, by way of non-limiting example, and with reference to the accompanying drawings in which:

FIGS. 5 and 6 show the contents of two differing data files which contents encode the image of FIG. 5;

DESCRIPTION OF PREFERRED EMBODIMENTS

Figure 1:
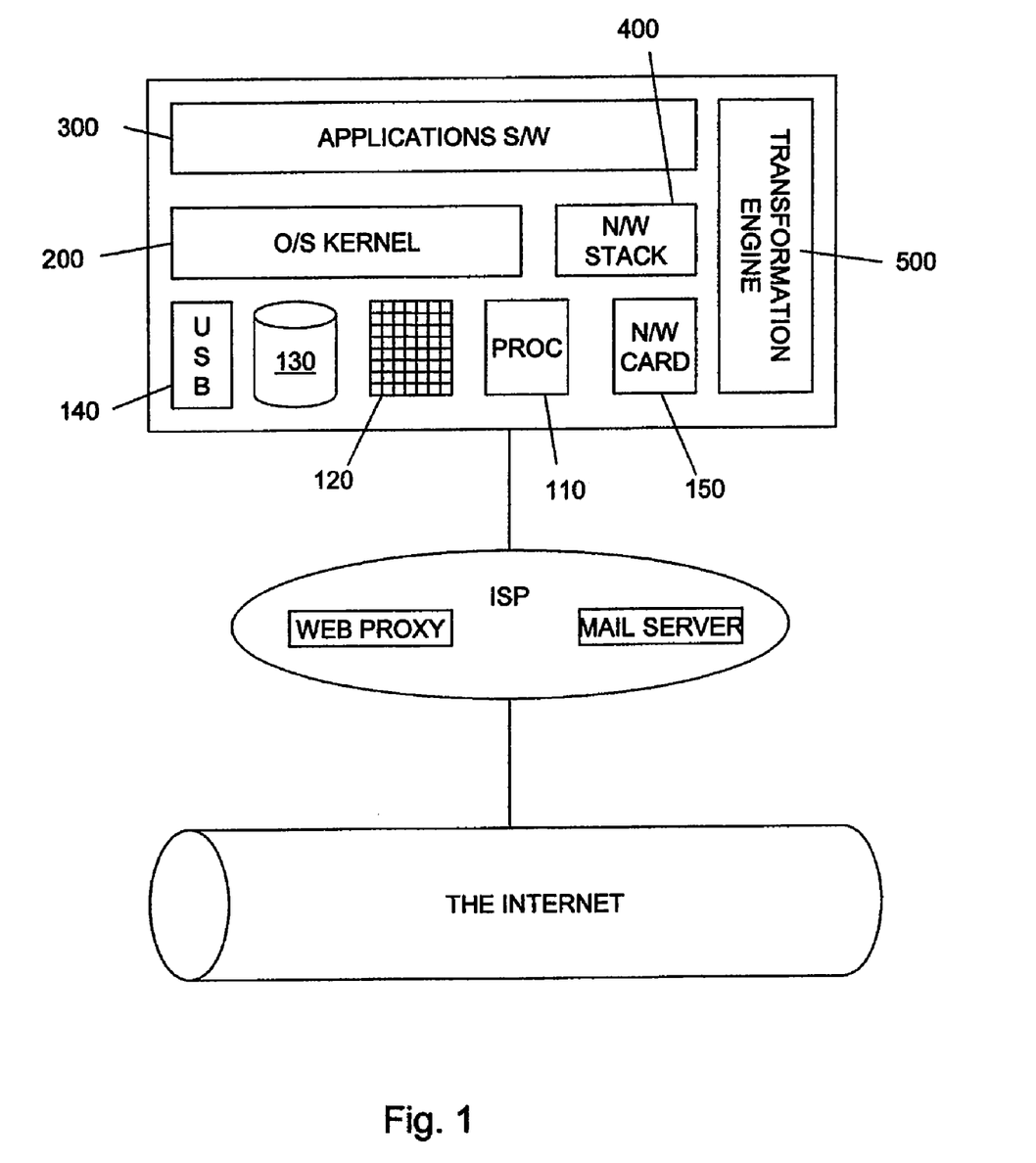
FIG. 1 is a schematic illustration of a typical Internet client computing platform and its connectivity to the Internet, the client computing platform including a file transformation engine embodying the present invention.

Referring now to FIG. 1, a typical client computing platform can be thought of as comprising three classes of functional elements. The first class of elements is the hardware 100, which includes the processor 110, memory 120, storage disc 130, peripheral USB port 140 and network card 150. The second class of functional element is the operating system 200, which is a low-level software program whose function is to provide access to common core services of the computing platform, including task scheduling, memory allocation and management, disk access allocation and management, and access to hardware devices such as the processor and network card. The operating system performs these tasks predominantly on behalf of one of a variety of applications programs, such as a word processor and email client, which form the third class of functional elements in the computer. Operating systems now most frequently come bundled with additional 'utilities' such as software programs which provide the user with a graphical interface by means of which a user may instruct the computer, a file browser, a web browser and so on. Although, functionally, this bundling makes it difficult, if not impossible to sever one or more of these utilities from the kernel of the operating system, taxonomically, they are nonetheless part of the applications programs class of elements and will be considered as such in this specification.

A further, ancillary functional element of the computing platform, which can neither properly be said to form part of the operating system, nor the applications programs, is the network stack 400. This is a hierarchy of programs which implement a hierarchical suite of networking protocols to enable network communication with other computing platforms. The network stack and the suites of protocols that it supports is well-known per se.

Virtually every user of such a computing platform will wish, at some time or other, wish to load one or more data files onto it. Such a file may be on some external storage medium which can be connected to the computer via a peripherals port such as a USB port, or it could be received in an email, or downloaded from a remote location via the internet. In each of these scenarios a user renders the computing platform vulnerable to attack by malicious code contained within the received file. Traditionally a user will save the file to the disc and then scan the file for viruses. This approach only works to the extent that any malicious code is already known in some form to the virus checking software on the computing platform.

Figure 2:
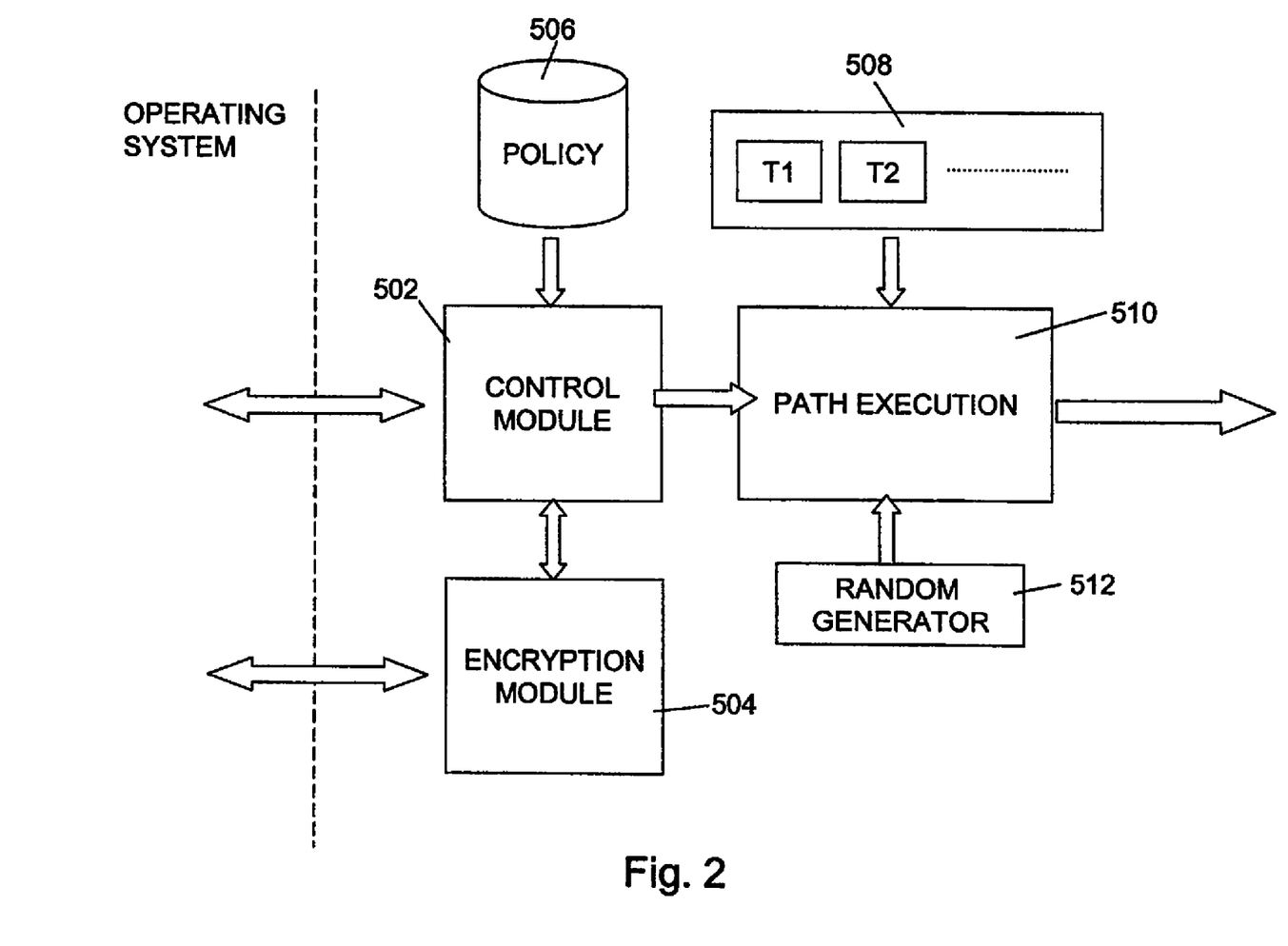
FIG. 2 is a flow chart detailing processes involved in transforming a received file.

In accordance with a first embodiment of the invention, the client computing platform additionally comprises a file transformation engine 500 which is adapted to modify each received file in order that any malicious code contained within it is rendered ineffective whether or not the malicious code is already known. Referring now to FIG. 2, the illustrated exemplary embodiment of the file transformation engine 500 has a functional architecture which comprises, at its core, a control module 502. The control module interacts with the operating system of the computing platform on which the engine runs to enable the engine to monitor whether files are being received and to retrieve files for transformation. Optionally, the control module 502 is additionally adapted to instruct an encryption module 504 to encrypt untransformed files for quarantined, secure storage and to instruct the operating system to overwrite raw received files, as appropriate. Whether receipt of a file is determined by the control module 502 to warrant execution of a file transformation may, if desired, depend upon a policy 506 which is in operation at any given time, regarding perceived levels of threats. This policy 506 is recorded within the transformation engine and updated as appropriate by an administrator. The policy may, also optionally additionally establish the extent or number of transformations to be applied to any given file. The control module implements a transformation, whether in accordance with one or more tailored, contemporaneous policies or on the basis of a blanket policy, by calling one or more transformation functions $T_1, T_2 \ldots$ recorded in a library 508. The identity of the called function or functions will preferably be determined from amongst a candidate set of the available functions; this candidate set comprises those functions in library 508 that are adapted to perform a transformation enabling manifestation to a user of at least some useful semantic file content to a user, and is established by the control module on the basis of the file type to be transformed and any user input that may have been provided regarding the intended use of the file concerned. The candidate set may, in suitable circumstances, comprise all the functions in the library but will usually comprise a subset of those functions.

File transformation is executed by the called library function or functions in a path execution module 510. Typically, though not necessarily, the file transformation will have a stochastic element to it, so that a random number generator can be used to randomise the or each available or appropriate file transformation function $T_1, T_2, \ldots$ which is employed.

Figure 3:
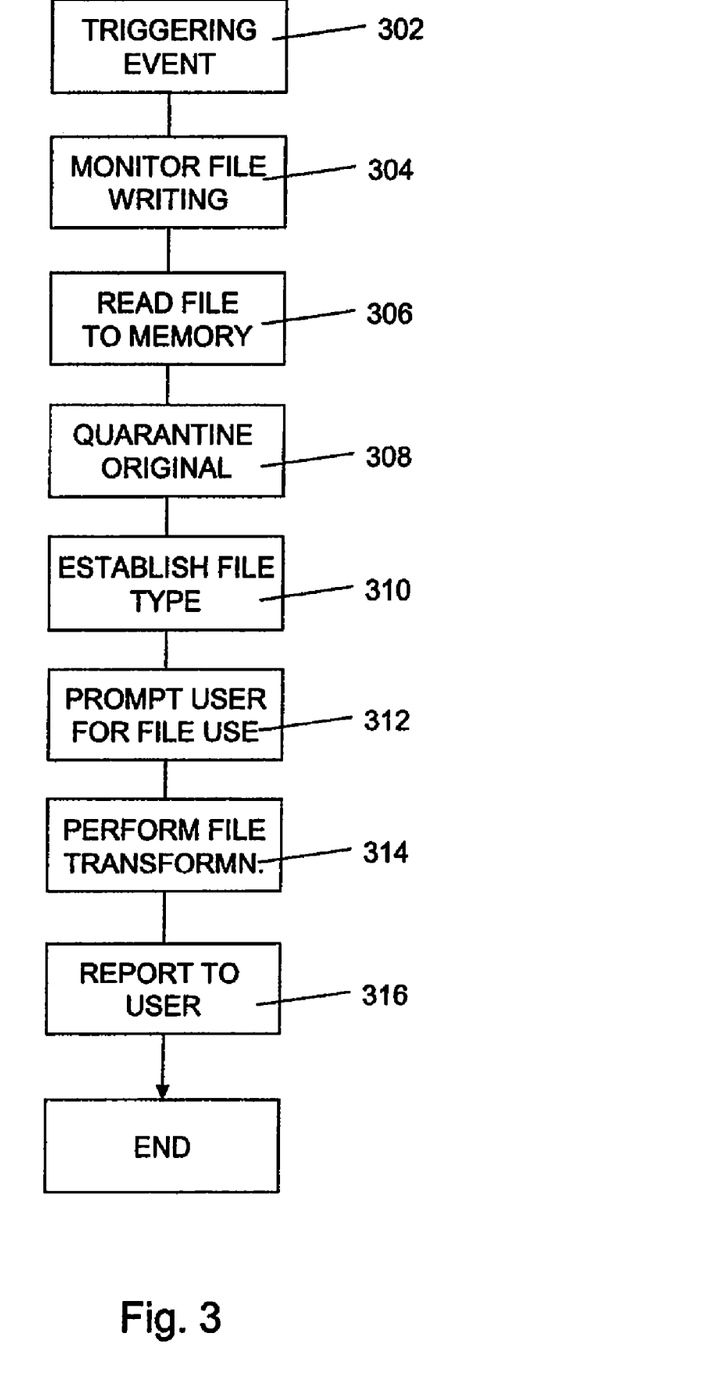
FIG. 3 is a functional block diagram of the file transformation engine included in the FIG. 1 client.

The operation of the computing platform and its transformation engine will now be described with reference to FIG. 3. In the present embodiment, the file transformation engine, via its control module's interaction with the Operating System kernel, monitors activities of the operating system kernel for certain specified 'triggering events'. Triggering events are any kernel activities which may manifest the receipt of a data file by whatever means. Data may be received in a number of ways, including (but not limited to) the following:

from an external storage medium and which is connected to the computing platform via a peripheral port (as the USB or Firewire ports, for example) or on a storage disc such as a CD which has been inserted into an appropriate disc drive.

in an email message which is then actuated to download an attached file;

in a downloading operation from a remote location on the network.

Kernel operations which may manifest the receipt of data are, therefore, typically (though not exclusively) the combination of an action indicating a state of readiness of the computing platform for the receipt of external data and the action of writing data to the disc. Actions which indicate readiness to receive data include the status of a peripheral port changing to indicate that external storage media is connected and or the allocation of a socket for an application level protocol program in the network stack (an action which typically indicates that data is about to be received).

Once, at step 302, a triggering event is detected, the transformation engine then monitors the kernel's activity at step 304 to determine the location at which the data file is being recorded. The location may be on the storage disc, in a situation, for example, where the user is seeking simply to save a received file. However, where a user is seeking to 'open' a data file directly from its current location—whether that is an external storage medium or a remote location within the network—this will involved reading the data into memory which, therefore, in this context, also amounts to a location at which the received data file is stored.

If the received data file has been written to disc, the transformation engine extracts the file and reads it into memory at step 306. If, however, received file has already been written into memory because the user is seeking to open the file remotely, then this step is unnecessary since it has already been performed. At step 308 the original file is quarantined by encrypting it, thereby to nullify any malicious code within it. At step 310 the transformation engine establishes the apparent file type of the received file. That is to say the file type is established on the basis of the file extension, even though, in an instance where the file contains malicious code, it is not unusual for the actual file type to differ from that which it purports to be from the file extension. Nonetheless, the apparent file type is the key parameter here for two reasons. Firstly, the file extension will, in the first instance, determine which application software the file is intended for use by and, therefore, via which application software any malicious code within the file may be seeking to launch an attack. Secondly, the file extension is an indication of the kind of file the user is expecting to receive.

In an optional step at 312, the user is then prompted to indicate the purpose that he or she is intending to open the file for. The various options that will be provided to the user will, naturally depend upon the nature of the file. Thus, for example, in the case of an image file, a user may wish simply to view the contents. Alternatively, the user may wish to modify the file. As already discussed, the role of the user's intended purpose is preferably taken into account in determining the file transformation effected in 314 and will be described in detail subsequently. The transformed file is then written to the disc, with the same file name as the original (though the file extension may now be different) and the occurrence reported to a user at step 316.

Predominantly, attacks on computing platforms exploit vulnerabilities exhibited by specific software applications (bearing in mind that, in the context of the present specification, various software utilities that are bundled with the operating system also amount to applications software). For example, a software application may be written in a manner that enables a data buffer to overflow—where the application attempts to write data which contains more bits than are allocated to the buffer intended by the program to store it. The result may be that the overflowing data is written to adjacent memory locations, often known in advance, with the consequence that when an application subsequently addresses those 'overwritten' memory locations, the data written to them can have the effect of causing the application to behave in an unintended manner. Two things will be apparent as a result. Firstly, malicious code is most often only effective as an attack when processed by the software application whose vulnerability (such as a buffer, assigned to store a received variable, which can overflow) it is intended to exploit. Secondly, to be effective in exploiting such vulnerabilities, malicious code must typically be 'bit perfect'; that is to say that any disruption in the bit pattern of code forming an attack is likely to render the code useless for that purpose. Embodiments of the invention exploit this characteristic of malicious code, in conjunction with human intelligence to nullify the code.

Figure 4:
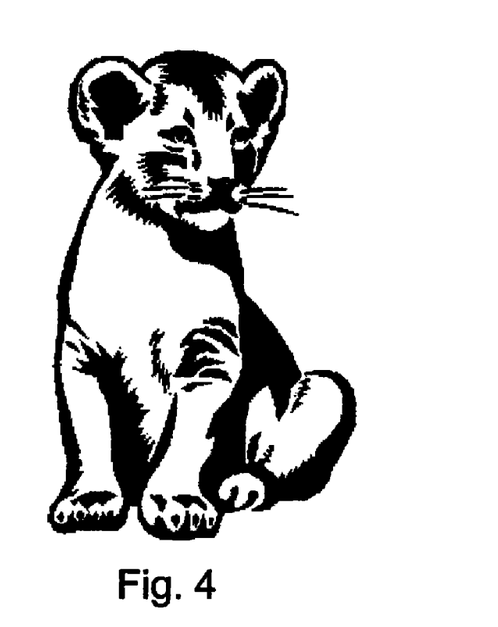
FIG. 4 is a digitally-recorded image.

Referring now to FIG. 4, an image of a lion cub is illustrated. The contents of one kind of data file which can encode this image is shown (the file itself being represented here in the corresponding ASCII characters rather than in full binary form), in FIG. 5. This, however, is not the only data which can be used to record the image and an alternative data file is shown in FIG. 6. Both produce an identical image. The file in FIG. 5, however, is a 'received' data file, and the file in FIG. 6 is that received file following transformation by the engine. The difference between the two files is that the received file is a .jpg file, and the transformed file is a .png file. In the present example, every single element of the original semantic content is provided to a user, since the pictures are identical in each case. It may, however, be unnecessary in order for the received data file to perform its function, for this to be the case. Thus, alternative transformations which may, depending upon the use which a user intends for the received data file, be sufficient to convey the necessary semantic content, include the passing of the image to software adapted to recognise the image as a lion cub and sending the user a text file which reads 'lion cub sitting down'. In an alternative but generally equivalent transformation, a library of images may be held and catalogued and a message sent to a user referring the user to the most similar image in the catalogue to that contained with a received data file—for example referring to the image by catalogue number. These examples obviously illustrate the extremes of data transformation, from transformation with no loss of semantic content, to transformations in which only a minimum of content is retained.

Figure 7:
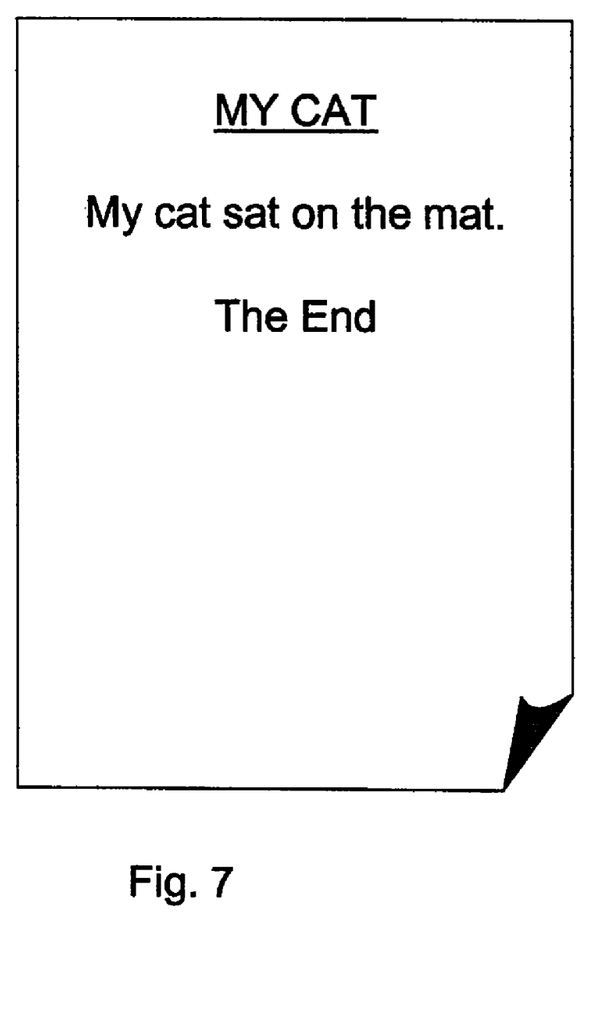
FIG. 7 shows a document recorded as a word-processing data file.
Figure 8:
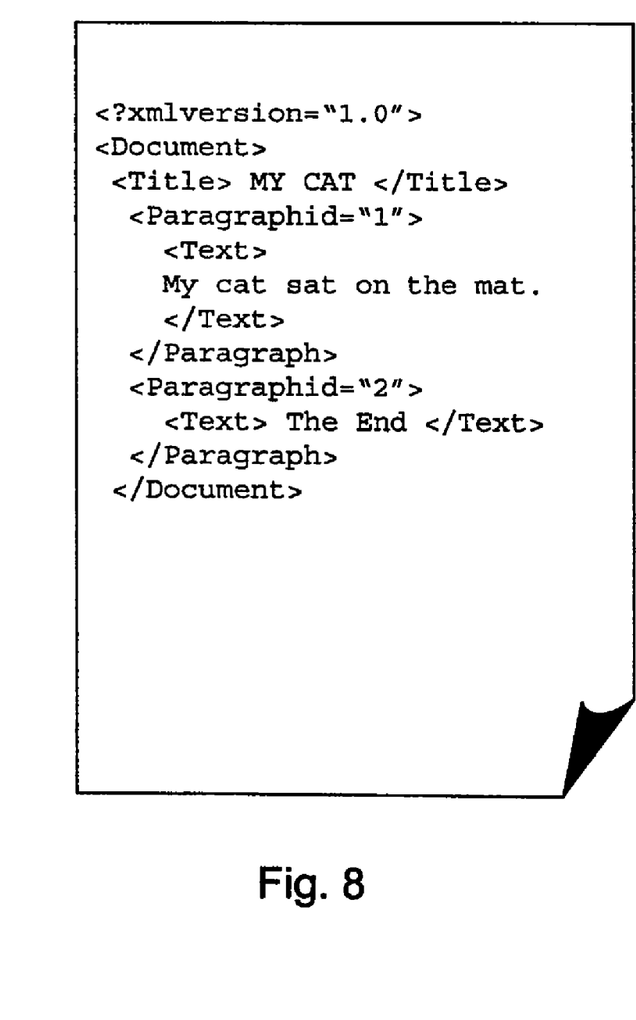
FIG. 8 shows the document of FIG. 7 expressed in XML syntax.

In another example of file transformation, referring now to FIG. 7 a document created by a (fictitious) word-processing software application is illustrated. This fictitious software application providing the word-processor is capable, as is increasingly the case in the real-world, of expressing and reading text documents in XML syntax. FIG. 8 illustrates a simplified expression of the document of FIG. 7 in XML. Simplified, since, in reality, it may contain, for example, embedded objects or other files, together with relatively complex formatting codes, most probably expressed as attributes of the XML tags, none of which are required to illustrate the principal underlying the present embodiment. Depending upon the purpose to which the user wishes to put the received word-processing document, a number of file transformations of such a document are possible. Thus, for example, if the user wishes only to read the text within the document, then a suitable transformation would be to parse the XML tags within the document to locate the text strings within it. In the example of the fictitious word-processing application, the text is contained within the tags <text> (although, depending upon the definitions in the namespace which the word processing application employs, any character string may connote the text strings). Once the text strings are located and extracted as binary sequences, the extracted sequences of bits can then be decoded into their corresponding ASCII characters and, using a bitmap writing application, they can be recorded as a bitmap which is then saved to disc.

However, as with each transformation, the file and any vulnerability it may pose would differ in several critical material respects. Firstly, because the file is now recorded as a bitmap, it will be opened and processed by a software application which is capable of reading a bitmap, rather than the word processing application for which both the file and any attack contained within that file will have been intended. The effect of this is that, even if the critical sequence of bits survived the writing of the text in bitmap form (which is extremely unlikely), it would no longer constitute malicious code for the simple reason that any malicious code within the original word processing file would have been written precisely to exploit characteristics of the application which would have processed it; which is not a bitmap reader. Secondly, to an extremely high level of probability, the process of extracting the bits representing text characters from the remainder of the file and then the decoding the extracted bits into text will have had at least one of two effects: either disrupting the bit pattern of any malicious code contained within the original file by the dropping of bits and/or insertion of bits during the course of the extraction and bitmap writing process; or discarding that code altogether following the text extraction process, for example where the malicious code was contained in a part of the original word-processing document which was not extracted. Because the bits within a malicious code attack must be very precisely written, the overwhelming likelihood is that this process will have disrupted the bit pattern of any attack and therefore rendered the attack nugatory.

A user opening the resulting bitmap file containing the text "MY CAT The cat sat on the mat. The End" will obtain at least part of the semantic content of the original file when manifested to he or she via the word processing application for which the received file was intended. Certain of the semantic content, however, will be missing. For example, where only the text simpliciter is extracted, the original format, typographical arrangement and so on will not appear, so that any meaning encoded by such features will be lost. In addition, any embedded objects (such as pictures) will not be rendered to the user. The file provided to the user will also lack the equivalent functionality of the original received file, since the ability, for example, to edit the document using the word processing application for which the received file was originally intended has been lost. Clearly, therefore, the use to which a user wishes to put a received file may be of importance in establishing the nature of the transformation to be applied to it. It is for this reason that the flow chart of FIG. 3 includes the optional step 312 of prompting the user to indicate the purpose for which he or she proposes to receive the file so as to enable, a candidate set of suitable transformations to be selected.

Figure 9:
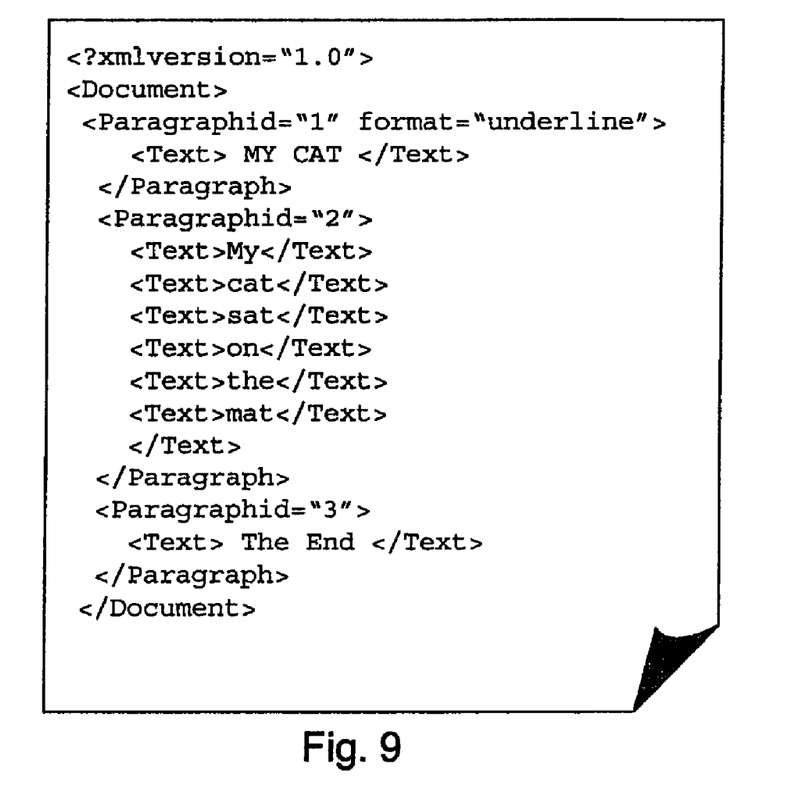
FIG. 9 shows a modification of the document in FIG. 7.

Where, in the present example, a user indicates in response to such a prompt, that the intended purpose of receiving the file includes the ability to edit the text and/or the format recorded within it using the word-processing application, a different transformation will, therefore, be required. Referring now to FIG. 9, an equivalent document to that shown in FIGS. 7 and 8 is illustrated in XML. It can be seen however, that different markup tags and different arrangements of previous markup tags are used to disrupt the bit patterns contained in the original file, while providing the same appearance of the text on the screen. Thus, for example, previously the first fragment of XML was defined by the <Title> tags. In accordance with the manner in which the fictitious word-processing application parses the XML, the <Title> tags are interpreted as requiring an underline of the text contained within them. An equivalent way of achieving the same effect, however, would be to omit the <Title> tags altogether and, instead, simply include the titular text within an ordinary paragraph. The text can then be specified as underlined using a 'format' attribute within the paragraph tag. Similarly, the main body of the text was originally contained within a single pair of <Text> tags. In the transformed document, each word is now contained within separate <Text> tags. In this way, the bit pattern of the original file is altered, while retaining most of the original file's semantic content. There is, nonetheless, arguably some loss of semantic content in the above example. For example, since the <Title> tags have now been removed, it is no longer explicitly expressed within the document as originally configured that the text in the first paragraph is a title. In an instance such as this, however, it is arguable that, because the vast majority of human readers have the semiotic interpretative capacity to recognise the initial text as a title, this modification does not result in the loss of any semantic content.

N.B. In relation to the above examples, it is emphasised that the word-processing program exemplified is fictitious. Accordingly, the examples of the manner in which the various XML tags are interpreted to generate a resultant document are likewise merely a fictitious example whose purpose is to illustrate the principle of transformation, both in the case of a word-processing document that can be expressed in XML syntax, and more generally.

The provision of alternative transformations for each different type of file, whether or not to accommodate user preferences, is a significant in that, as with any mechanism designed to protect against malicious attacks, once the mechanism becomes known to an attacker, work begins immediately upon developing a method of circumventing the defence. However, in the present case since there are multiple possible file transformations available, the transformation engine is arranged to select a transformation at random, this selection either being from all available transformations, or where a candidate set of transformations has been formed on the basis of the intended use of the file, from the candidate set of transformations. A writer of malicious code will, therefore, never have the certainty as to which transformation will be applied to the code. Accordingly, even if becomes possible to write malicious code which is sufficiently robust to withstand one kind of file transformation, the likelihood of a different transformation being applied means that the attack is not certain to succeed—and the ability to write code which is robust enough to withstand multiple, differing file transformations is of yet a higher degree of difficulty again.

In an optional modification, certain elements of different transformations are combined at random providing the possibility of a very large number of alternative transformations to the extent that no two transformations are ever the same.

It is in the nature of malicious code that it is not possible to know all of the characteristics of any potential attack, since new vulnerabilities which may form the basis for an attack are found every day by potential attackers. It is, however, the case that disrupting the bit pattern of a file with a frequency of $1/(N-1)$, whether by dropping a bit every $N-1$ bits or by introducing one, will be sufficient to ensure disruption of the bit pattern of any render any attack of N bits in length or longer. Accordingly, one way of establishing the extent of any transformation which it is desired to perform, would be to make an estimate of the minimum length of any attack and then to disrupt the bit pattern of a file with a frequency which is at least large enough to ensure that an attack of such a length will have been disrupted. Naturally, any such policy ought to be kept secret since it may itself provide a potential attacker with a 'fixed target'—i.e. an attack of less than or equal to a certain number of bits. Even if it were possible to achieve this, however, there is, nonetheless, depending on the length of the attack and the frequency which with the file containing it is disrupted, a reasonable chance the attack will be rendered ineffective. In this regard, the use of this form of analysis also has significant utility in establishing the length of malicious code against which the present embodiments are not effective.

Running the transformation engine on a client computing platform will normally require the engine to have privileged access to certain of the operating system kernel functions. Such access can, however, itself provide a route for attack. Accordingly, in a preferred embodiment, the client computing platform operates virtualising software to provide two virtual machines, each with its own distinct operating system environment, operating on a single hardware platform. In this manner, received files will be opened and transformed by one virtual machine, while the other virtual machine, being the one that user 'sees' and on which the various applications are run, is only able to gain access to files which have been transformed.

The embodiments of the present invention thus far described relate to the provision of a file transformation engine on a computing platform in the form of a client computer. This scenario is most likely to find practical implementation (though by no means limited to such a scenario) in the instance of a domestic user whose ISP is not contracted to provide such services on his or her behalf. In an alternative scenario, the ISP provides, via transformation engines running on centralized computing platform(s) providing web proxy and mail server services, transformation of files received via the web and email for a subscribing user.

Figure 10:
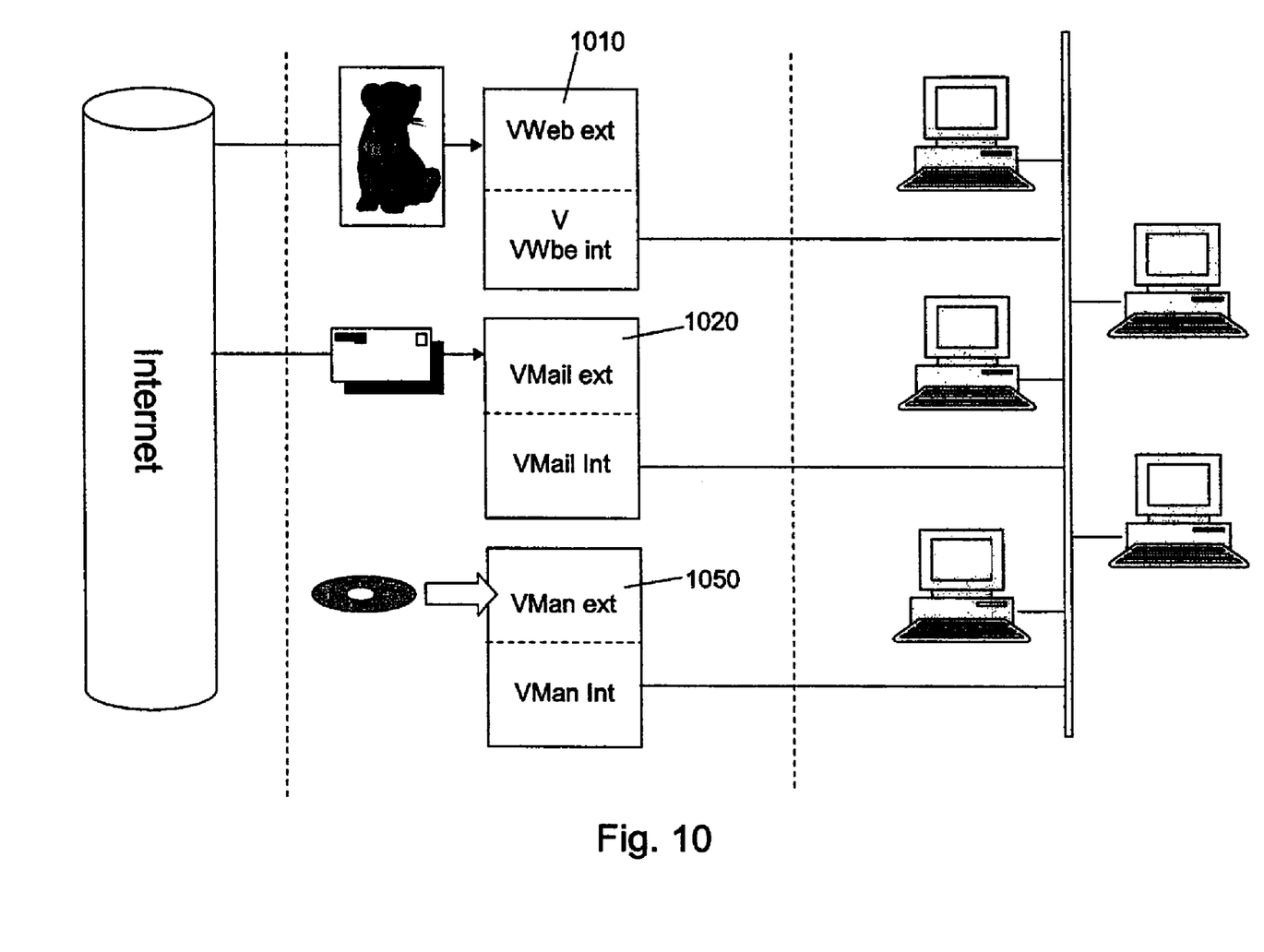
FIG. 10 is a schematic illustration of a network of a commercial organisation depicting several centralized computing platforms provided with transformation engines embodying the present invention.

FIG. 10 illustrates a further possible scenarioin which a number of client computers are connected to a local area network (LAN) of a commercial or government organisation. In such organisations, it is not uncommon for each of the client computers only to have access to the web (i.e. the ability to invoke HTTP requests, say) via a web proxy server 1010, while the organisation will run its own email server 1020. This 'classical' architecture can readily be adapted to provide a number of dedicated, centralised computing platforms on which to run transformation engines. In one embodiment, separate, dedicated transformation engines are provided in the Web Proxy 1010 and the Email server 1020. Further, dedicated proxy servers and transformation engines can, additionally be provided for other protocols which may be invoked to download data by client computers within the LAN, as a appropriate. As stated previously, the transformation engine itself may be the source of a vulnerability, given the character of the access which it requires to kernel operations in order to operate efficiently. To obviate such a vulnerability, each of the web proxy and the Email server are divided into two virtual machines in a manner known per se each running a virtually distinct operating system. One virtual operating system on each of these platforms, the Webext virtual operating system on the Web Proxy 1010 and the Emailext virtual operating system on the mail server 1020, is 'outward facing'. The outward facing virtual operating systems provide a platform for receiving incoming files and running the transformation engine. The other operating system on each of these platforms is inward facing and communicates with the LAN, enabling it to transmit transformed data files. In this way, if the transformation process gives rise to an opportunity to attack the outward facing platform, the attack will nonetheless be contained within the external-facing operating system.

A further source of vulnerability for a commercial organisation nonetheless remains, this being the scenario where a user, in good faith, 'manually' introduces a storage medium to their client machine which contains a file containing malicious code. One solution to deal with this scenario is to run a transformation engine on each client machine, with or without virtualisation; a virtualized implementation of such a solution will be described hereinafter with reference to FIG. 11. However, a simple and arguably more secure alternative solution is to provide one or more dedicated computing platforms to act as 'manual proxies' 1050 for receiving files on portable storage media, and which it is mandatory for users to employ when receiving files stored on portable media (a policy which can be enforced, for example, by physically disabling external peripherals ports on each client computer). As with the web and mail servers, the operating system of the or each 'manual server' is virtualised into two distinct operating systems: ManExt, which is the operating system which receives the data from the external storage media and on which the transformation engine runs; and ManInt, which is connected to the internal networks. Thus a user may introduce a storage medium on which a data file is introduced into the Manual proxy 1050, the file is written to the hard drive by the ManExt operating system and then transformed in whatever manner is appropriate by the transformation engine running on that virtual OS. The transformed file is then retrieved by the inward facing operating system, ManInt which then transmits the file to the appropriate client computer (specified by a user at a prompt from the ManInt operating system, for example) using the internal LAN.

Figure 11:
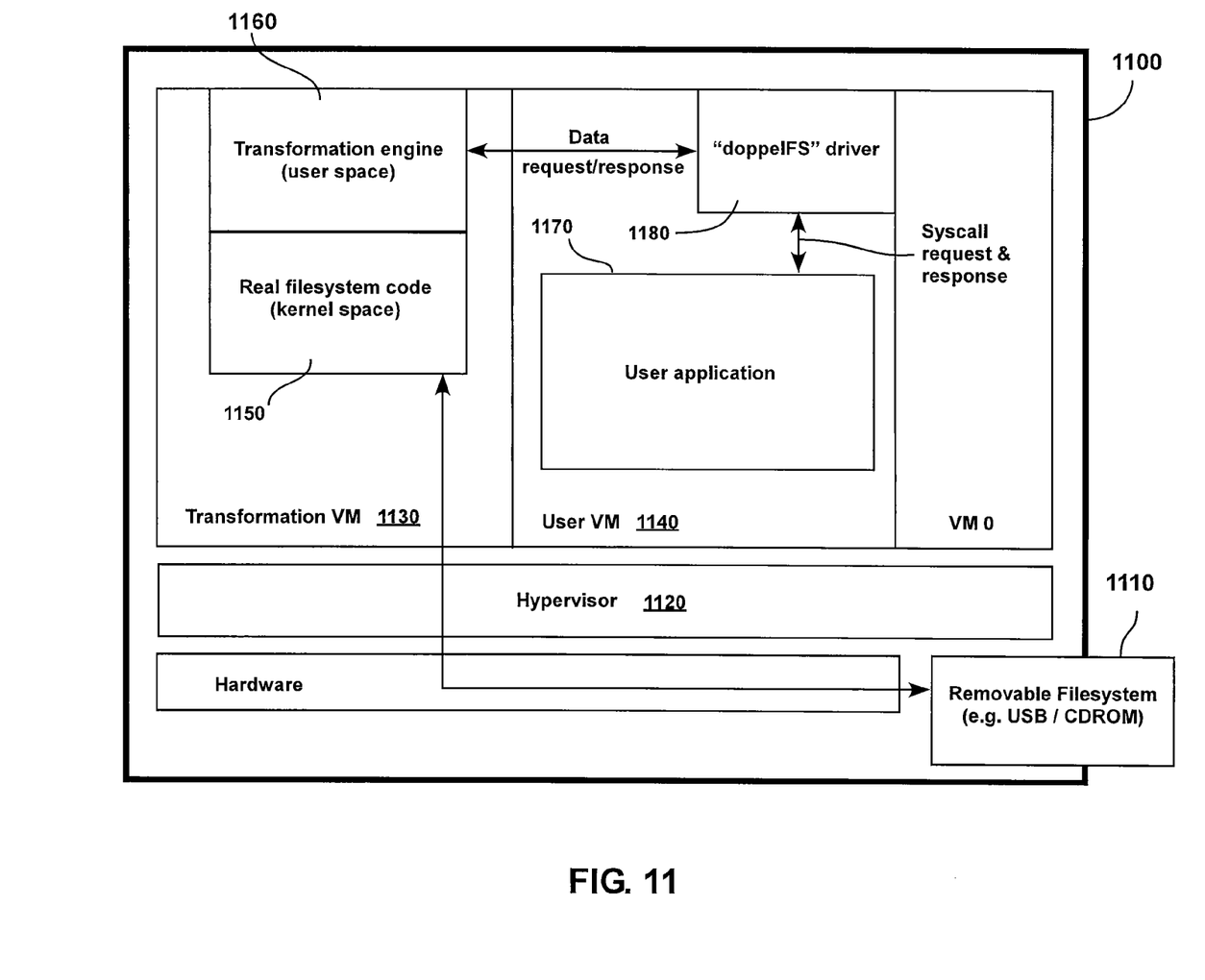
FIG. 11 is a diagram of a user computer providing a dedicated virtual machine for running a transformation engine embodying the invention, the transformation engine serving to transform files retrieved from a removable storage device for manifestation in a user virtual machine provided by the computer.

FIG. 11 depicts a user computing platform 1100 arranged to transform files retrieved from a removable storage device 1110 (e.g. CDROM, USB memory stick) for manifestation to a user. In this example, the user computing platform runs a hypervisor 1120 to provide multiple virtual machines; one virtual machine 1140 is used for running user applications (such as application 1170) and another virtual machine 1130 is used for running access code 1150 for accessing the filesystem of the removable storage device 1110, and a transformation engine 1160 (similar to that already described) for transforming files retrieved from the removable storage device 1110.

When the removable storage device 1110 is installed in the user computing platform 1100, its filesystem is mounted as a special type, herein called "doppelFS". This causes the device filesystem to be mounted as its true type (FAT32, Ext2 etc) in the virtual machine 1130. The operating system loaded in the user virtual machine 1140 has a special driver 1180 for filesystems of type "doppelFS" which upon an operating system syscall being generated by the user application 1170 to retrieve data from the removable storage device 1110, an instance of the doppelFS driver 1180 is created to access the "doppelFS" filesystem; this doppelFS driver instance requests the transformation virtual machine 1130 to access the "doppelFS" filesystem which it does using the true filesystem type. After the real filesystem code 1150 of the transformation virtual machine 1130 has retrieved the true requested data, the transformation engine 1160 applies a policy-driven but non-deterministic set of one or more data transformations and returns the transformed data to the doppelFS driver instance. The doppelFS driver instance then passes the transformed data back to the user application 1170 which originally requested data.

The arrangement described above with respect to FIG. 11 is transparent to the user who to all extents and purposes accesses the data as they normally would. For performance reasons, in the FIG. 11 arrangement (and, indeed, also in other embodiments of the invention) the transformations applied to the retrieved data may be done prior to the actual requests for data and cached ready for a quick response to a request of a transformed data. It will be appreciated that the FIG. 11 arrangement is equally applicable to non-removable filesystems in the foregoing embodiments where a computing platform uses virtualization techniques to provide a dedicated virtual machine for the transformation engine, a number of options are possible for its utility, and these will most typically be established by a policy (herein the "virtual machine" or "VM" policy). Thus, in one VM-policy example, the transformation-engine virtual machine may be put into operation for a maximum period of time, say an hour, during which time it may be used for every transformation occurring within that period before being effectively deleted. In an alternative VM policy, the transformation-engine virtual machine may be newly created for each individual transformation and then destroyed immediately afterwards. In yet a further alternative VM policy, the transformation-engine virtual machine can be created and used for a set number of transformations before being destroyed. Preferably, a randomised combination of these VM policies is employed in a manner analogous to the randomised selection of transformation(s) employed. In this way it becomes yet harder for any attacker to write malicious code sufficiently robust to withstand all potential combinations of events. If an attacker simply repeats his attack, until the appropriate combination of events for which it may be robust occurs, the likelihood is that, by that time, the attack will have come to the attention of firewall and other administrators and thus will be prevented from taking effect in the conventional manner.

In the present examples, the various modifications are not limited to being employed solely in connection with the embodiments in connection with which they were first described, and are generally applicable.

The invention claimed is:

1. A method of transforming malicious code potentially contained within a data file received by a computing platform, the method comprising:
    selecting, at random, a transformation function to be applied to the received data file from at least two available transformation functions, each available transformation function being such as to alter the bit pattern of a file to which it is applied while still enabling manifestation of at least a portion of the file's semantic content to a user, and
    applying, by a computer, the selected transformation function to the received data file to generate a transformed file.

2. A method according to claim 1, wherein application of the selected transformation function takes place within a client computer at which the transformed file is to be manifested to a user.

3. A method according to claim 2, wherein the client computer provides multiple virtual machines, a first said virtual machine applying the selected transformation function to the received file and passing the transformed file to a second said virtual machine for manifestation to the user.

4. A method according to claim 3, wherein the received file is received from the file system of a storage device, this file being retrieved from the storage device by the first virtual machine in response to a request received from a filesystem driver of the second virtual machine.

5. A method according to claim 1, wherein application of the selected transformation function takes place within a computer remote from a client computer at which the transformed file is to be manifested to a user, the method further comprising sending the transformed file to the client computer.

6. A method according to claim 1, wherein at least one further transformation function, additional to said at least two available transformation functions and comprising a combination of elements of said at least two available transformation functions, is also available for random selection.

7. A method according to claim 1, further comprising:
    receiving data from a user regarding a use to which he/she is intending to put the received file, and
    using the data provided by the user to form a candidate set of multiple transformation functions from the available transformation functions on the basis of which transformation functions will produce transformed files capable of manifesting semantic content relevant the intended said use, the random selection being effected from the candidate set.

8. A method according to claim 1, further comprising selecting a length in bits (N bits), of a minimum length of malicious code against which a transformation is to be effective and transforming the received data file by disrupting its bit pattern with a frequency of 1/(N−1) bits or greater.

9. A method according to claim 1, further comprising initial operations of:
    detecting occurrence of an event indicative of receipt of said data file by the computing platform; and
    determining whether, in accordance with a predetermined policy, the received file requires transformation.

10. A method according to claim 1, wherein multiple transformation functions are selected and applied to the received file to generate a final transformed file.

11. A transformation engine for nullifying malicious code potentially contained within a data file, the transformation engine comprising:
    a library of available transformations each arranged to alter the bit pattern of a file to which it is applied while still enabling manifestation of at least a portion of the file's semantic content to a user;
    a selection arrangement for selecting, at random, a transformation to be applied to the
    data file from said available transformations; and
    an arrangement for applying the selected transformation to the data file to generate a transformed file.

12. A transformation engine according to claim 11, arranged to create at least one further transformation, additional to said available transformations, by combining of elements of the available transformations, said at least one further transformation being also available for random selection.

13. A transformation engine according to claim 11, wherein the selection arrangement is arranged to receive input from a user regarding a use to which he/she is intending to put the received file, and to use the user-input data to form a candidate set of multiple transformations from the available transformations on the basis of which transformations will produce transformed files capable of manifesting semantic content relevant the intended said use, the random selection being effected from the candidate set.

14. A transformation engine according to claim 11, wherein each said available transformation is operative to disrupt the bit pattern of the data file with a frequency of 1/(N−1) bits or greater where N is a predetermined minimum length, in bits, of malicious code against which the transformation is to be effective.

15. A transformation engine according to claim 11, further comprising a policy-application arrangement for determining whether, in accordance with a predetermined policy, the data file requires transformation.

16. A computing platform including a transformation engine according to claim 11, the computing platform being a client computer at which the transformed file is to be manifested to a user.

17. A computing platform according to claim 16, wherein the client computer is arranged to provide multiple virtual machines, a first said virtual machine serving to apply the selected transformation to the data file and to pass the transformed file to a second said virtual machine for manifestation to the user.

18. A computing platform according to claim 17, including a storage device for storing said data file, the first virtual machine being arranged to retrieve the data file from the storage device in response to a request received from the second virtual machine.

19. A computing platform comprising:
- a transformation engine according to claim 11, the computing platform being a computer remote from a client computer at which the transformed file is to be manifested to a user,
- a communication arrangement for sending the transformed file to the client computer.

20. A computing platform having a transformation engine according to claim 11, wherein the platform is adapted to provide multiple distinct virtual machines, the said transformation engine being arranged to run in one said virtual machine.

21. A computing platform according to claim 20, wherein creation of the transformation-engine virtual machine is performed in accordance with a VM policy that specifies the basis upon which the transformation-engine virtual machine is utilised for transformations.

22. A computing platform according to claim 21, wherein the VM policy includes, as alternatives, that transformation-engine virtual machine is utilised:
- (a) for a predetermined number of file transformations;
- (b) for all file transformations occurring within a predetermined interval of time;
- (c) for certain classes of file transformation;
- (d) only for a single file transformation.

* * * * *